United States Patent
Jang et al.

(10) Patent No.: US 10,727,469 B2
(45) Date of Patent: Jul. 28, 2020

(54) SECONDARY BATTERY

(71) Applicant: Samsung SDI Co., Ltd., Yongin-si, Gyeonggi-do (KR)

(72) Inventors: Myung Jae Jang, Yongin-si (KR); Seung Ho Kwak, Yongin-si (KR); Hyun Soo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/038,035

(22) Filed: Jul. 17, 2018

(65) Prior Publication Data

US 2019/0067667 A1  Feb. 28, 2019

(30) Foreign Application Priority Data

Aug. 31, 2017  (KR) .................. 10-2017-0111140

(51) Int. Cl.
*H01M 2/26* (2006.01)
*H01M 10/052* (2010.01)
*H01M 10/0585* (2010.01)

(52) U.S. Cl.
CPC ............. *H01M 2/266* (2013.01); *H01M 2/26* (2013.01); *H01M 2/263* (2013.01); *H01M 10/052* (2013.01); *H01M 10/0585* (2013.01)

(58) Field of Classification Search
CPC .. H01M 10/052; H01M 10/0585; H01M 2/26; H01M 2/263; H01M 2/266
See application file for complete search history.

(56) References Cited

U.S. PATENT DOCUMENTS

| | | | |
|---|---|---|---|
| 8,722,237 B2 | 5/2014 | Guen | |
| 8,795,882 B2 | 8/2014 | Kambayashi et al. | |
| 9,236,595 B2 | 1/2016 | Lee et al. | |
| 2008/0076019 A1* | 3/2008 | Wu | H01M 2/263 429/161 |

(Continued)

FOREIGN PATENT DOCUMENTS

| | | |
|---|---|---|
| JP | 2013-77546 A | 4/2013 |
| JP | 2015-53266 A | 3/2015 |

(Continued)

OTHER PUBLICATIONS

EPO Extended Search Report dated Dec. 21, 2018, for corresponding European Patent Application No. 18190381.6 (9 pages).

*Primary Examiner* — Miriam Stagg
*Assistant Examiner* — Lilia Nedialkova
(74) *Attorney, Agent, or Firm* — Lewis Roca Rothgerber Christie LLP

(57) ABSTRACT

A secondary battery capable of achieving a higher capacity than a related art jelly-rolled electrode assembly is provided, the secondary battery including an electrode assembly including a first electrode plate and a second electrode plate, each having an uncoated portion protruding from a respective one of laterally opposite sides of the electrode assembly; a current collector at a region corresponding to the uncoated portion of the electrode assembly; and a ductile sub-tab electrically connecting the uncoated portion of the electrode assembly to the current collector, wherein the uncoated portion and the sub-tab are connected to each other and bent together in the same direction.

17 Claims, 17 Drawing Sheets

(56) References Cited

U.S. PATENT DOCUMENTS

| | | | |
|---|---|---|---|
| 2011/0104537 A1* | 5/2011 | Lee | H01M 2/22 |
| | | | 429/94 |
| 2012/0148910 A1 | 6/2012 | Kambayashi et al. | |
| 2012/0251874 A1 | 10/2012 | Guen | |
| 2013/0130100 A1 | 5/2013 | Kurata et al. | |
| 2013/0330593 A1 | 12/2013 | Kim et al. | |
| 2016/0099440 A1* | 4/2016 | Park | H01M 2/0217 |
| | | | 429/53 |

FOREIGN PATENT DOCUMENTS

| | | |
|---|---|---|
| JP | 5699578 | 4/2015 |
| KR | 10-1286005 | 7/2013 |
| KR | 10-2016-0059688 | 5/2016 |

* cited by examiner

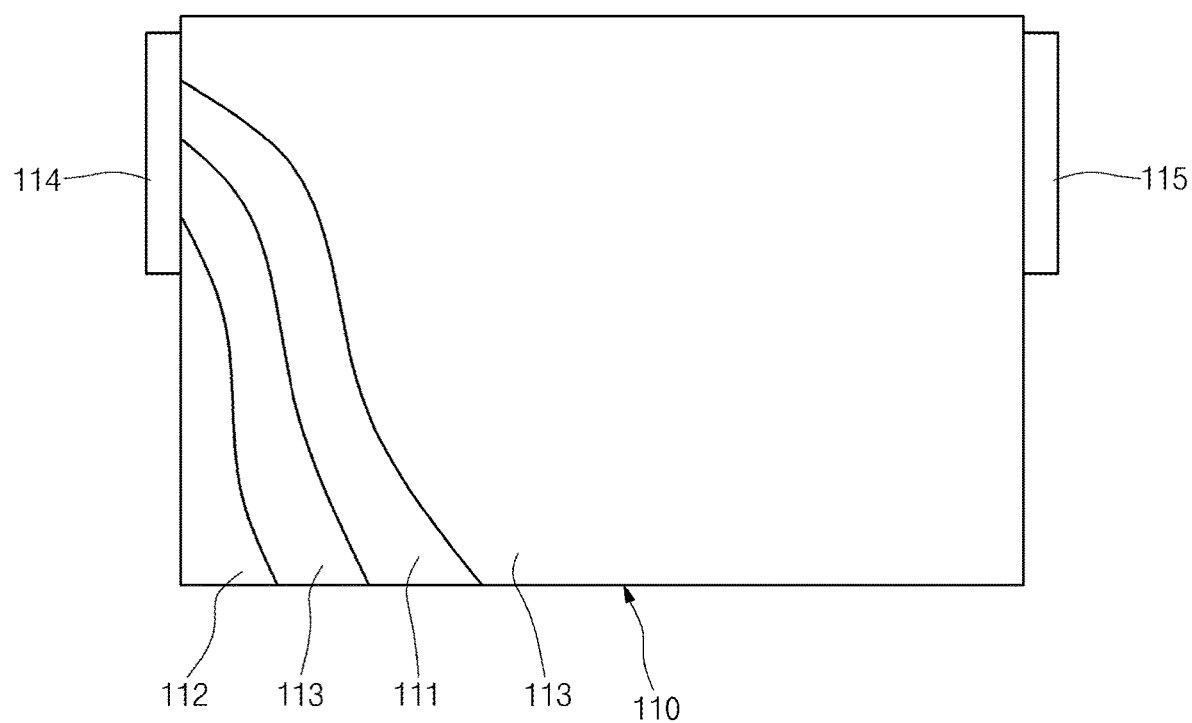

SECONDARY BATTERY

CROSS-REFERENCE TO RELATED APPLICATION

This application claims priority to and the benefit of Korean Patent Application No. 10-2017-0111140, filed on Aug. 31, 2017 in the Korean Intellectual Property Office, the entire content of which is herein incorporated by reference.

BACKGROUND

1. Field

One or more aspects of embodiments of the present disclosure relate to a secondary battery.

2. Description of the Related Art

Unlike a primary battery that cannot be charged, a secondary battery may be recharged. A low-capacity secondary battery including, for example, one single battery cell may be used as the power source for various portable small-sized electronic devices, such as cellular phones and camcorders. A high-capacity secondary battery, in which several tens of battery cells are connected in a battery pack, may be used as a power source for motor drives (e.g., motor vehicles), such as those in hybrid electric vehicles or electric vehicles.

A secondary battery is configured such that an electrode assembly formed by positive and negative electrode plates with a separator as an insulator interposed therebetween, and an electrolyte, are housed in a case, and a cap plate is coupled to the case. Here, representative examples of the electrode assembly may include a jelly-rolled electrode assembly. In the jelly-rolled electrode assembly, uncoated portions protrude from upper portions of the electrode assembly and current collectors are connected to the upper portions of the electrode assembly.

In the secondary battery having such a configuration, however, there may be a squandering of a cell space, which limits an increase in the battery capacity, and tab portions connected to the current collectors may penetrate into the electrode assembly during an assembling process, which degrades battery stability.

SUMMARY

One or more aspects of embodiments of the present disclosure are directed toward a secondary battery including an electrode assembly capable of achieving a higher capacity than a related art jelly-rolled electrode assembly.

One or more aspects of embodiments of the present disclosure are directed toward a secondary battery capable of preventing (or reducing) the occurrence of electrical shorts to its tab portions.

According to an embodiment of the present disclosure, there is provided a secondary battery including an electrode assembly including a first electrode plate and a second electrode plate, each having an uncoated portion protruding from a respective one of laterally opposite sides of the electrode assembly, a current collector at a region corresponding to the uncoated portion of the electrode assembly, and a sub-tab electrically connecting the uncoated portion of the electrode assembly to the current collector.

The uncoated portion and the sub-tab may be connected to each other and bent together in the same direction.

The sub-tab may be a ductile sub-tab.

The secondary battery may further include a lead tab electrically connecting the uncoated portion of the electrode assembly to the sub-tab. Here, the uncoated portion, the lead tab and the sub-tab may be connected to one another and may be bent together in the same direction.

The lead tab may be a ductile lead tab.

The electrode assembly may be a stacked electrode assembly.

The uncoated portion and the sub-tab may be connected to each other in a stacked direction of the electrode assembly and bent together in a width direction of the electrode assembly, the width direction crossing (e.g., perpendicular to) the stacked direction.

The sub-tab may be welded to the current collector and the uncoated portion may be welded to the sub-tab.

The current collector may include a first section extending in a width direction of the electrode assembly, and a second section bent from the first section and extending in a height direction of the electrode assembly, the height direction crossing (e.g., perpendicular to) the width direction, wherein the second section includes a bent section configured to receive the sub-tab and the uncoated portion.

The bent section of the current collector may include a pair of bent parts respectively bent from end portions of the second section toward the electrode assembly; and a receiving part connected to the pair of bent parts, the bent section being configured to receive the sub-tab and the uncoated portion.

The secondary battery may further include a retainer combined with the current collector and covering the uncoated portion and the sub-tab.

The retainer may have a height, in the height direction of the electrode assembly, and a width, in a stacked direction of the electrode assembly, at least as those of the second section of the current collector.

The sub-tab may include a first region connected to the current collector, and a second region connected to the uncoated portion, wherein the second region is folded together with the uncoated portion to overlap with the first region in a width direction of the electrode assembly.

The sub-tab may include one or more bending grooves at a boundary between the first region and the second region.

The uncoated portion may include an uncoated portion-first region in contact with a corresponding one of the laterally opposite sides of the electrode assembly, and an uncoated portion-second region connected to the second regions of the sub-tab, wherein the uncoated portion-second region is folded together with the second region of the sub-tab to overlap the uncoated portion-first region in the width direction of the electrode assembly.

A height and a width of the uncoated portion-second region may be substantially the same as those of the second region of the sub-tab.

The secondary battery may further include an insulation tape surrounding the electrode assembly and the current collector.

The current collector may extend along and may be coupled to a corresponding one of the laterally opposite sides of the electrode assembly, the current collector being deflected to one edge of the one of the laterally opposite sides of the electrode assembly, in a stacked direction of the electrode assembly.

The sub-tab may have a smaller thickness than that of the current collector.

The sub-tab may be substantially the same in width, in a stacked direction of the electrode assembly, as the second section of the current collector, and the uncoated portion may be substantially the same in width, in the stacked direction of the electrode assembly, as the second section of the current collector.

As described above, the example secondary battery according to the present disclosure employs a stacked electrode assembly, thereby achieving a higher capacity than a related art jelly-rolled electrode assembly.

In addition, since the example secondary battery according to the present disclosure includes tab portions connected to current collectors to then be folded on the current collectors, it may be possible to prevent or protect the tab portions from penetrating into the electrode assembly during an assembling process, thereby preventing or reducing electrical shorts from occurring to the tab portions.

BRIEF DESCRIPTION OF DRAWINGS

These and/or other aspects will become apparent and more readily appreciated from the following description of the embodiments, taken in conjunction with the accompanying drawings in which:

FIGS. 2B and 2C respectively show a front view and a perspective view of a stacked electrode assembly in the example secondary battery shown in FIG. 1.

DETAILED DESCRIPTION

Figure 1:
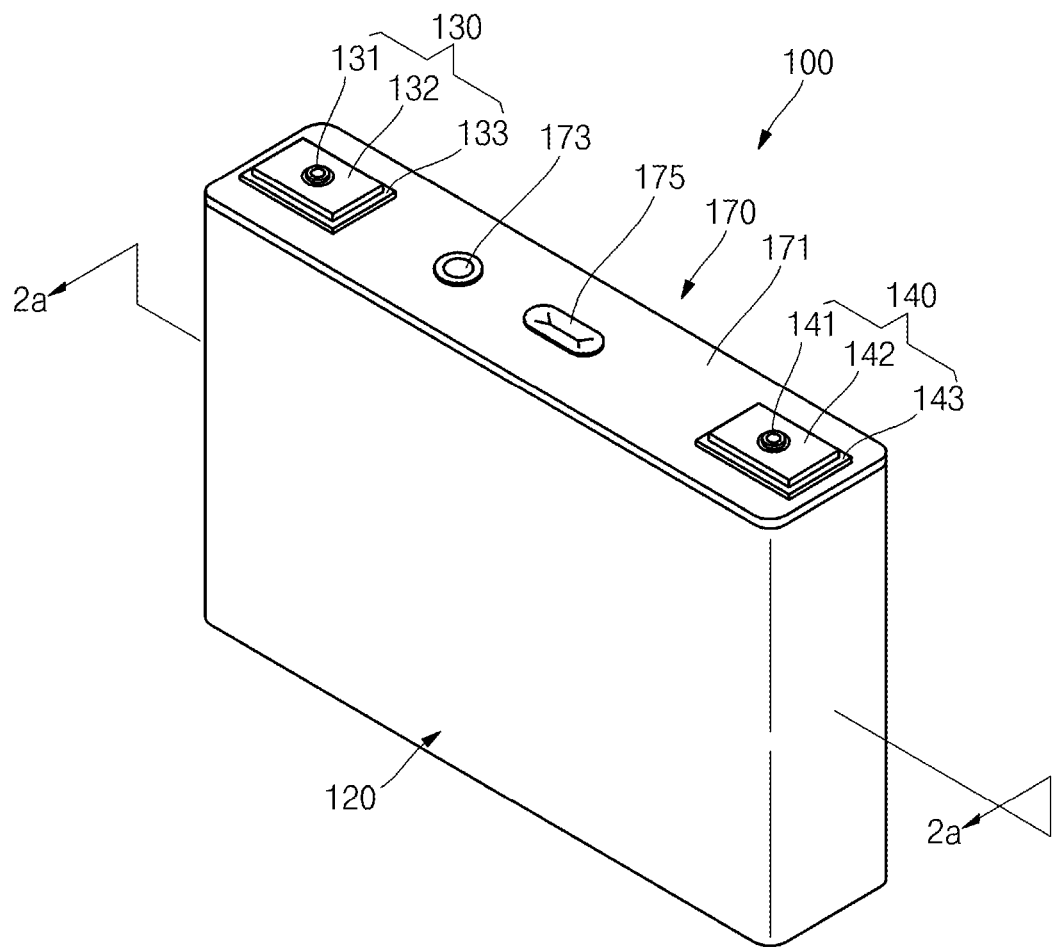
FIG. 1 shows a perspective view of an example secondary battery.

Hereinafter, example embodiments of the present disclosure will be described in more detail.

Various examples of the present disclosure may be embodied in many different forms and should not be construed as being limited to the example embodiments set forth herein. Rather, these examples of the disclosure are provided so that this disclosure will be thorough and complete and will convey inventive concepts of the disclosure to those skilled in the art.

In addition, in the accompanying drawings, sizes or thicknesses of various components are exaggerated for brevity and clarity. Like numbers refer to like elements throughout. In addition, it will be understood that when an element A is referred to as being "connected to" or "coupled to" an element B, the element A can be directly connected to the element B or an intervening element C may be present and the element A and the element B may be indirectly connected to each other.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the term "below," for example, can encompass both an orientation of above and below.

As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention may refer to "one or more embodiments of the present invention."

Figure 2A:
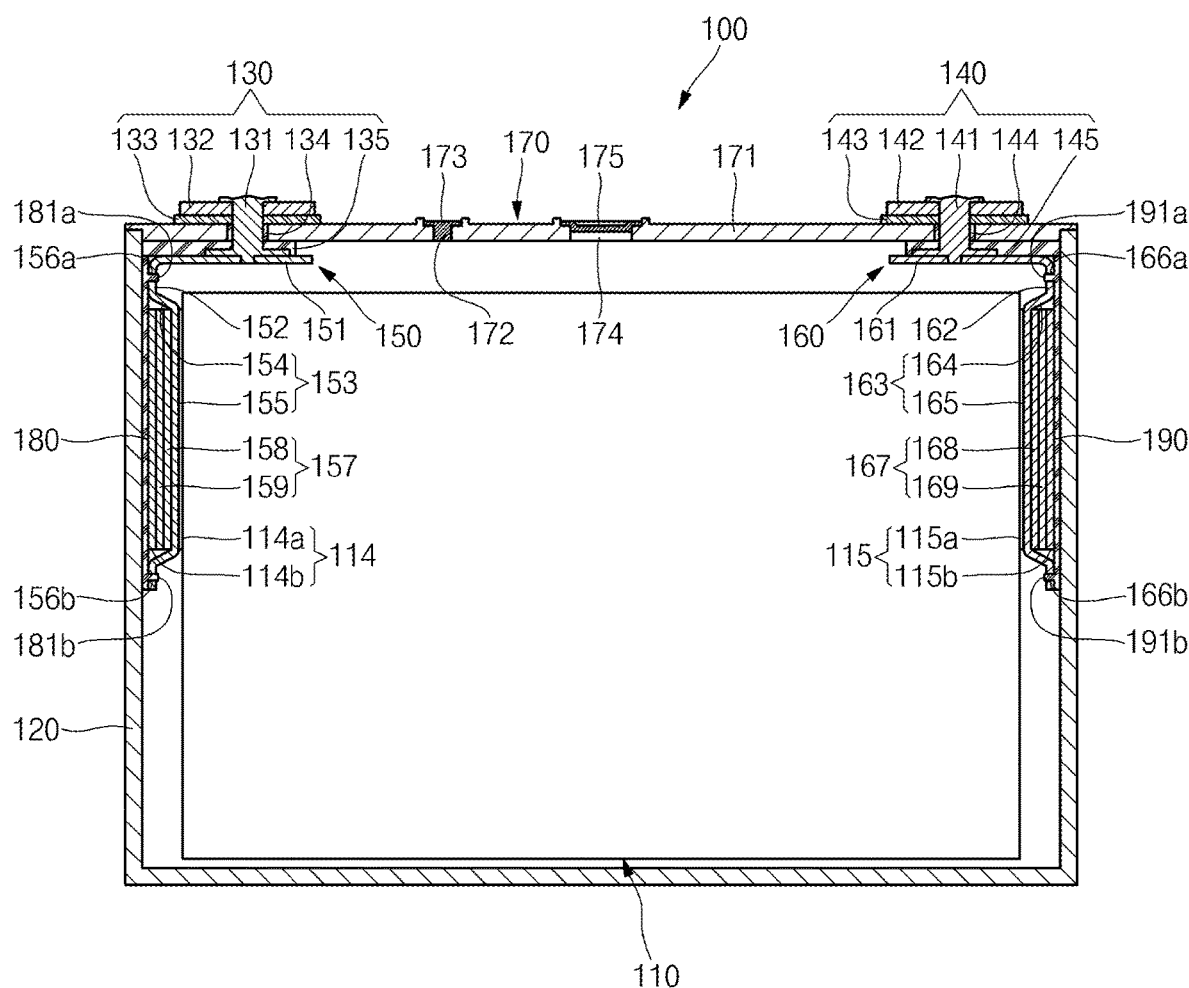
FIG. 2A shows a cross-sectional view taken along the line 2a-2a of FIG. 1.
Figure 2C:
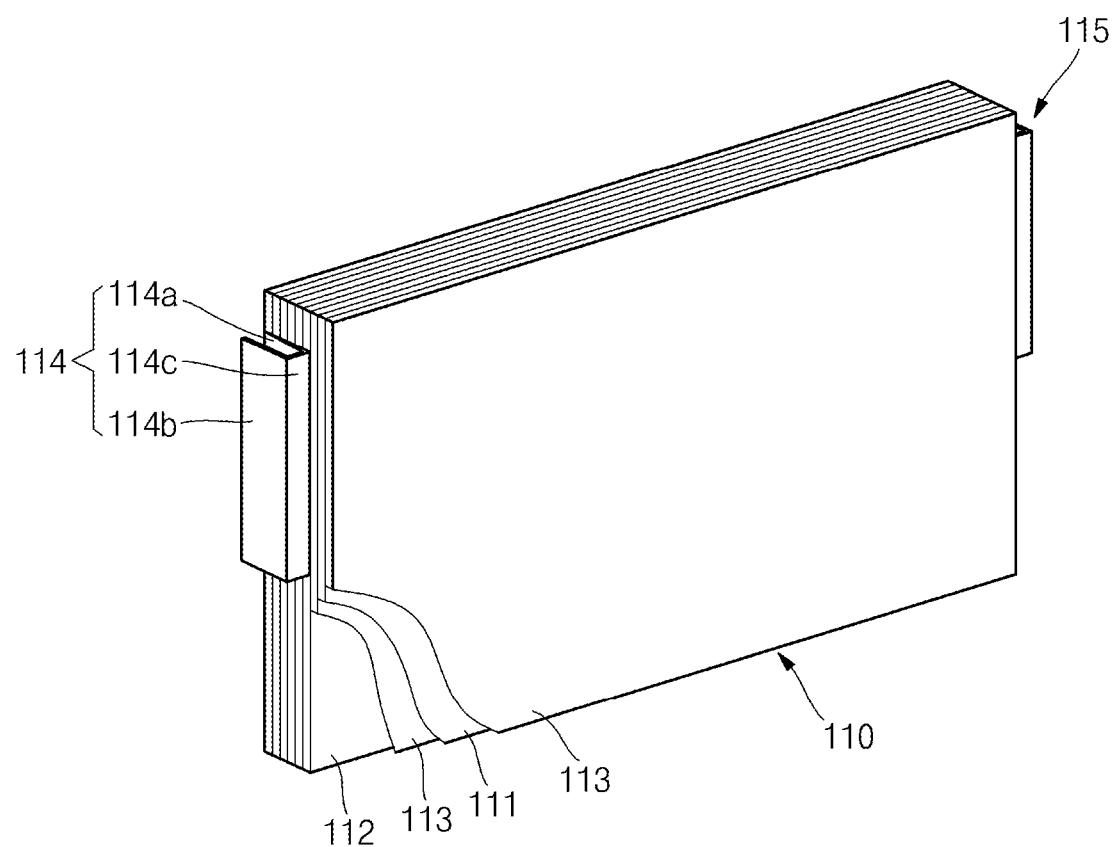
Figure 2D:
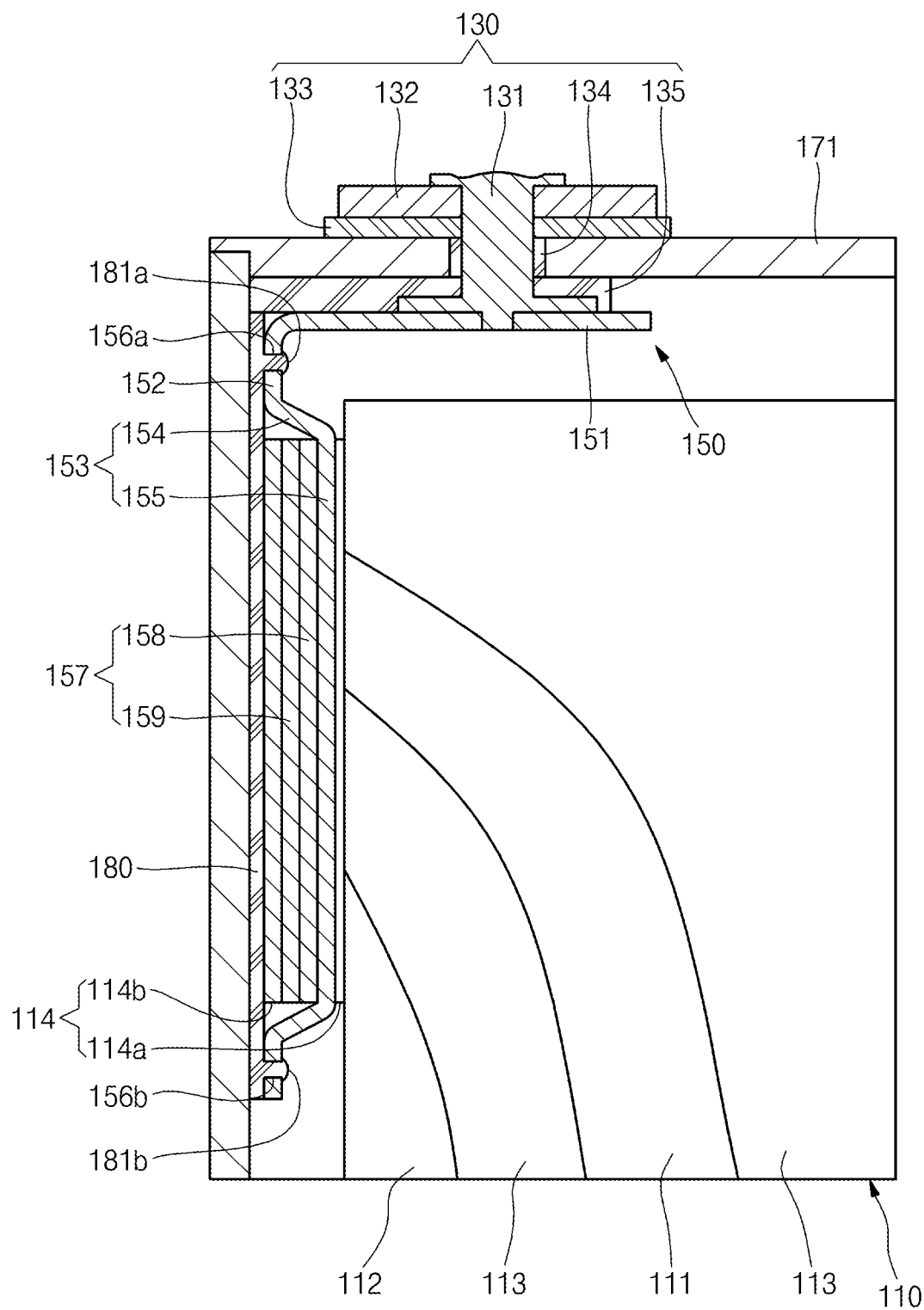
FIG. 2D shows a partly enlarged view illustrating connection relationship among current collectors, sub-tabs and uncoated portions.

FIG. 1 shows a perspective view of an example secondary battery 100. FIG. 2A shows a cross-sectional view taken along the line 2a-2a of FIG. 1, FIGS. 2B and 2C show a front view and a perspective view of a stacked electrode assembly 110 in the example secondary battery 100 shown in FIG. 1, and FIG. 2D shows a partly enlarged view illustrating connection relationship among current collectors 150 and 160, sub-tabs 157 and 167, and uncoated portions 114 and 115.

Referring to FIGS. 1 and 2A to 2D, the example secondary battery 100 of the present disclosure may include a stacked electrode assembly 110, a case 120 receiving the electrode assembly 110, a first terminal portion 130 electrically connected to one side of the electrode assembly 110 (e.g., a first uncoated portion 114), a second terminal portion 140 electrically connected to the other side of the electrode assembly 110 (e.g., a second uncoated portion 115), a first current collector 150 and a first sub-tab 157 interposed between the one side of the electrode assembly 110 and the first terminal portion 130, a second current collector 160 and a second sub-tab 167 interposed between the other side of the electrode assembly 110 and the second terminal portion 140, and a cap assembly 170 coupled to an opening of the case 120.

In addition, the example secondary battery 100 of the present disclosure may further include a first retainer 180 and a second retainer 190 installed within the case 120.

The example secondary battery 100 of the present disclosure will now be described with regard to a prismatic lithium ion secondary battery by way of an example. However, embodiments of the present disclosure are not limited to the example battery type described herein, and the present disclosure can also be applied to various batteries, including lithium polymer batteries.

The electrode assembly 110 may be configured such that a first electrode plate 111, a second electrode plate 112, and a separator 113 interposed between the first and second electrode plates 111 and 112 are stacked (refer to FIGS. 2C and 2D). In some embodiments, the electrode assembly 110 may not be wound in a jelly-roll configuration but may be formed by sequentially stacking the first electrode plate 111, the separator 113 and the second electrode plate 112, which may all be of substantially rectangular shapes. When the stacked rectangular electrode assembly 110 is coupled to the case 120 having an approximately parallelepiped opening, there will be little gap between the electrode assembly 110 and the case 120, thereby considerably increasing battery capacity.

Here, the first electrode plate 111 may operate as a negative electrode and the second electrode plate 112 may operate as a positive electrode. In some embodiments, the first electrode plate 111 may operate as a positive electrode and the second electrode plate 112 may operate as a negative electrode. However, for brevity and clarity, the present disclosure will be described with regard to an example case in which the first electrode plate 111 operates as a negative electrode and the second electrode plate 112 operates as a positive electrode.

The first electrode plate 111 may be formed by coating a first electrode active material (such as graphite and/or carbon) on a first electrode current collector formed of a metal foil made of copper, a copper alloy, nickel and/or a nickel alloy, and may include a first uncoated portion 114 where the first electrode active material is not applied. The first uncoated portion 114 may function as a path for the flow of current between the first electrode plate 111 and the first terminal portion 130.

As shown in FIG. 2C, the first uncoated portion 114 may protrude/extend from one side of the electrode assembly 110 by a predetermined (or set) length to then be bent in an approximately U-shaped configuration, and may be connected to the first sub-tab 157 while surrounding the first current collector 150 and the first sub-tab 157. In some embodiments, the first uncoated portion 114 of the electrode assembly 110 is planar in its original configuration, but can then be bent in the approximately U-shaped configuration so as to be connected to the first current collector 150 and the first sub-tab 157.

When the first uncoated portion 114 is in a U-shaped configuration, it may include a first region 114a that is in contact with one side of the electrode assembly 110, a second region 114b that is spaced apart from and is substantially parallel with the first region 114a, and a third region 114c connecting the first and second regions 114a and 114b.

The second electrode plate 112 may be formed by coating a second electrode active material (such as transition metal oxide) on a second electrode current collector formed of a metal foil made of aluminum and/or an aluminum alloy, and may include a second uncoated portion 115 where the second electrode active material is not applied. The second uncoated portion 115 may function as a path for the flow of current between the second electrode plate 112 and the second terminal portion 140.

Here, the second uncoated portion 115 may protrude and extend from the other side of the electrode assembly 110 by a predetermined (or set) length to then be bent in an approximately U-shaped configuration, and may be connected to the second sub-tab 167 while surrounding the second current collector 160 and the second sub-tab 167. In some embodiments, the second uncoated portion 115 of the electrode assembly 110 is planar in its original configuration, but may then be bent in the approximately U-shaped configuration so as to be connected to the second current collector 160 and the second sub-tab 167.

When the second uncoated portion 115 is in a U-shaped configuration, it may include a first region 115a that is in contact with the other side of the electrode assembly 110 (opposite from the side of the electrode assembly that is in contact with the first uncoated portion 114), a second region 115b spaced apart from and substantially parallel with the first region 115a, and a third region connecting the first and second regions 115a and 115b.

In addition, the first uncoated portion 114 and the second uncoated portion 115 may be configured such that they protrude/extend/are bent from the electrode assembly 110 at a predetermined (or set) length in laterally opposite directions.

The separator 113 disposed (e.g., positioned) between the first electrode plate 111 and the second electrode plate 112 may prevent (or reduce) an electrical short therebetween (e.g., between the electrode plates) and may allow for the movement of lithium ions. The separator 113 may include polyethylene, polypropylene, or a composite film of polyethylene and polypropylene. However, the present disclosure does not limit the material of the separator 113. In some embodiments, the separator 113 may be replaced by a solid electrolyte.

The electrode assembly 110 may be received in the case 120 along with, for example, an electrolyte, but is not limited thereto. The electrolyte may include a lithium salt, such as $LiPF_6$ and/or $LiBF_4$, dissolved in an organic solvent, such as EC, PC, DEC, EMC, and/or DMC. In some embodiments, the electrolyte may be in a liquid phase, a solid phase or a gel phase.

The case 120 may have the shape of an approximately rectangular parallelepiped having a hollow cavity with a top opening. Thus, the electrode assembly 110 may be inserted into the inside of the case 120 through the opening.

The first terminal portion 130 may be electrically connected to the first uncoated portion 114 of the electrode assembly 110 by the first current collector 150 and the first sub-tab 157. Here, the first terminal portion 130 may include a first terminal pillar 131 penetrating a cap plate 171 of the cap assembly 170 to be electrically connected to the first current collector 150 in the case 120. In addition, the first sub-tab 157 may be connected to the first current collector 150, and the first uncoated portion 114 of the electrode assembly 110 may be then electrically connected to the first sub-tab 157.

The first current collector 150 and the first sub-tab 157 may be made of the same material as the first uncoated portion 114. In some embodiments, if the first uncoated portion 114 is made of a copper or nickel-based material, the first current collector 150 and the first sub-tab 157 may also be made of a copper or nickel-based material. Therefore, the first sub-tab 157 may be easily welded to the first current collector 150, and the first uncoated portion 114 may be easily welded to the first sub-tab 157.

In addition, the first sub-tab 157 may be easily bendable. In some embodiments, since the first sub-tab 157 needs to be bent in approximately L- and/or U-shaped configurations in the course of manufacturing the example secondary battery 100, the first sub-tab 157 may have ductility. For example, the first sub-tab 157 may have a smaller thickness than the first current collector 150.

The second terminal portion 140 may be electrically connected to the second uncoated portion 115 of the electrode assembly 110 by the second current collector 160 and the second sub-tab 167. Here, the second terminal portion 140 may include a second terminal pillar 141 penetrating the cap plate 171 of the cap assembly 170 to be electrically connected to the second current collector 160 in the case 120. In addition, the second sub-tab 167 may be connected to the second current collector 160, and the second uncoated portion 115 of the electrode assembly 110 may be then electrically connected to the second sub-tab 167.

The second current collector 160 and the second sub-tab 167 may be made of the same material as the second uncoated portion 115. In some embodiments, if the second uncoated portion 115 may be made of an aluminum-based material, the second current collector 160 and the second sub-tab 167 may also be made of an aluminum-based material. Thus, the second sub-tab 167 may be easily welded to the second current collector 160, and the second uncoated portion 115 may be easily welded to the second sub-tab 167.

In addition, the second sub-tab 167 may be easily bendable. In some embodiments, since the second sub-tab 167 needs to be bent in approximately L- and/or U-shaped configurations in the course of manufacturing the example secondary battery 100, the second sub-tab 167 may have ductility. For example, the second sub-tab 167 may have a smaller thickness than the second current collector 160.

The cap assembly 170 may include the cap plate 171 in the shape of a planar panel. In some embodiments, the cap plate 171 may be formed of a thin panel and may be coupled to the opening of the case 120 to close the opening. The cap plate 171 may include an electrolyte injection unit 172 for injecting an electrolyte into the closed case 120. After the injection of the electrolyte, the electrolyte injection unit 172 may be closed by a seal plug 173. In addition, the cap plate 171 may include a vent hole 174 and a vent plate 175 installed in the vent hole 174 and configured to rupture when the internal pressure of the closed case 120 exceeds a preset pressure.

In some embodiments, the first terminal portion 130 may be positioned on the cap plate 171 and may include the first terminal plate 132 (made of, for example, aluminum) coupled to the first terminal pillar 131, a first terminal upper insulation member 133 installed between the first terminal plate 132 and the cap plate 171, a first terminal seal gasket 134 interposed between the first terminal pillar 131 and the cap plate 171, and a first terminal lower insulation member 135 installed between the first current collector 150 connected to the first terminal pillar 131 and the cap plate 171.

The second terminal portion 140 may be positioned on the cap plate 171 and may include the second terminal plate 142 (made of, for example, aluminum) coupled to the second terminal pillar 141, a second terminal upper insulation member 143 installed between the second terminal plate 142 and the cap plate 171, a second terminal seal gasket 144 interposed between the second terminal pillar 141 and the cap plate 171, and a second terminal lower insulation member 145 installed between the second current collector 160 connected to the second terminal pillar 141 and the cap plate 171.

In some embodiments, the second terminal upper insulation member 143 may be replaced by a high-resistance conductor. In this case, the cap plate 171 and the case 120 may have the same polarity with the second terminal portion 140. In some embodiments, the example secondary battery 100 may include the case 120 and the cap plate 171 charged with positive polarity.

The first current collector 150 may be positioned at one side of the electrode assembly 110 and may have a particular structure to efficiently receive the first uncoated portion 114 and the first sub-tab 157. In some embodiments, the first current collector 150 may include a first section 151 extending in a width direction of the electrode assembly 110 (e.g., substantially parallel with a top surface of the electrode assembly 110 and/or the length direction of the cap plate 171), and a second section 152 vertically bent from the first section 151 and extending in a height direction of the electrode assembly (e.g., substantially parallel with a side surface of the electrode assembly 110). Here, the first section 151 may be coupled to the first terminal pillar 131.

In addition, a bent section 153 having a predetermined (or set) depth may be formed in the second section 152 so as to receive the first uncoated portion 114 and the first sub-tab 157. In some embodiments, the bent section 153 may include a pair of bent portions 154 symmetrically bent from the end portions of the second section 152 toward the electrode assembly 110, and a receiving part 155 connecting the pair of bent portions 154 and configured to receive the first uncoated portion 114 and the first sub-tab 157.

In some embodiments, the first sub-tab 157, for example, may be connected (e.g., welded) to the receiving part 155 and then bent in an L-shaped configuration, the first uncoated portion 114 bent in an L-shaped configuration may be connected (e.g., welded) to the first sub-tab 157, and the first uncoated portion 114 and the first sub-tab 157 may then be bent together in a U-shaped configuration.

In some embodiments, throughholes 156a and 156b may be formed at top and bottom ends of the second section 152, respectively, and the first retainer 180 may be engaged with the throughholes 156a and 156b while covering the first uncoated portion 114 and the first sub-tab 157. In some embodiments, protrusions 181a and 181b formed on the first retainer 180 may be engaged with the throughholes 156a and 156b, respectively, and the first retainer 180 may be eventually combined (e.g., coupled) with the second section 152 substantially in parallel. Although the second section 152 may be formed to be deflected to one side from the center of the one side surface of the electrode assembly 110 (which will be described later), the first retainer 180 may entirely cover the second section 152, as well as the whole of the one side surface of the electrode assembly 110.

The second current collector 160 may be positioned at the other side of the electrode assembly 110 (e.g., opposite from the first current collector 150) and may have a particular structure to efficiently receive the second uncoated portion 115 and the second sub-tab 167. In some embodiments, the second current collector 160 may include a first section 161 extending in the width direction of the electrode assembly (e.g., substantially parallel with the top surface of the electrode assembly 110 and/or the length direction of the cap plate 171), and a second section 162 vertically bent from the first section 161 and extending in the height direction of the electrode assembly (e.g., substantially parallel with a side surface of the electrode assembly 110). Here, the first section 161 may be coupled to the second terminal pillar 141.

In addition, a bent section 163 having a predetermined (or set) depth may be formed in the second section 162 to receive the second uncoated portion 115 and the second sub-tab 167. In some examples, the bent section 163 may include a pair of bent portions 164 symmetrically bent from the end portions of the second section 162 toward the electrode assembly 110, and a receiving part 165 connecting the pair of bent portions 164 and receiving (e.g., configured to receive) the second uncoated portion 115 and the second sub-tab 167.

In some embodiments, the second sub-tab 167, for example, may be connected (e.g., welded) to the receiving part 165 and then bent in an L-shaped configuration, the second uncoated portion 115 bent in an L-shaped configuration may be connected (e.g., welded) to the second sub-tab 167, and the second uncoated portion 115 and the second sub-tab 167 may then be bent together in a U-shaped configuration.

In some embodiments, throughholes 166a and 166b may be formed at top and bottom ends of the second section 162, respectively, and the second retainer 190 may be engaged with the throughholes 166a and 166b while covering the second uncoated portion 115 and the second sub-tab 167. In some embodiments, protrusions 191a and 191b formed on the second retainer 190 may be engaged with the throughholes 166a and 166b, respectively, and the second retainer 190 may be eventually combined (e.g., coupled) with the second section 162 substantially in parallel. Although the second section 162 may be formed to be deflected to one side from the center of the one side surface of the electrode assembly 110 (which will be described later), the second retainer 190 may entirely cover the second section 162, as well as the whole of the other side surface of the electrode assembly 110.

The first sub-tab 157 may be interposed between the second region 114b of the first uncoated portion 114 and the first current collector 150 and may connect the first uncoated portion 114 of the electrode assembly 110 to the first current collector 150. In some embodiments, the first sub-tab 157 may include a first region 158 and a second region 159. The first region 158 may be connected to the first current collector 150, and the second region 159 may be connected to the second region 114b of the first uncoated portion 114. In addition, the first and second regions 158 and 159 of the first sub-tab 157 may be bent to overlap each other, thus forming a U-shaped configuration.

The second sub-tab 167 may be interposed between the second region 115b of the second uncoated portion 115 and the second current collector 160 and may connect the second uncoated portion 115 of the electrode assembly 110 to the second current collector 160. In some embodiments, the second sub-tab 167 may include a first region 168 and a second region 169. The first region 168 may connected to the second current collector 160 and the second region 169 may be connected to the second region 115b of the second uncoated portion 115. In addition, the first and second regions 168 and 169 of the second sub-tab 167 may be bent to overlap each other, thus forming a U-shaped configuration.

The first retainer 180 may be of a substantially planar shape and may be an insulator. The first retainer 180 may include protrusions 181a and 181b formed at its top and bottom ends. The protrusion 181a formed at the top end of the first retainer 180 may be engaged with the throughhole 156a formed at the top end of the second section 152 of the first current collector 150, and the protrusion 181b formed at the bottom end of the first retainer 180 may be engaged with the throughhole 156b formed at the bottom end of the second section 152. The first retainer 180 may cover the first uncoated portion 114, the first sub-tab 157 and the second section 152 of the first current collector 150, thereby preventing (or reducing) these components from electrically contacting the case 120.

The second retainer 190 may be of a substantially planar shape and may be an insulator. The second retainer 190 may include protrusions 191a and 191b formed at its top and bottom ends. The protrusion 191a formed at the top end of the second retainer 190 may be engaged with the throughhole 166a formed at the top end of the second section 162 of the second current collector 160, and the protrusion 191b formed at the bottom end of the second retainer 190 may be engaged with the throughhole 166b formed at the bottom end of the second section 162. The second retainer 190 may cover the second uncoated portion 115, the second sub-tab 167 and the second section 162 of the second current collector 160, thereby preventing (or reducing) these components from electrically contacting the case 120.

Figure 3A:
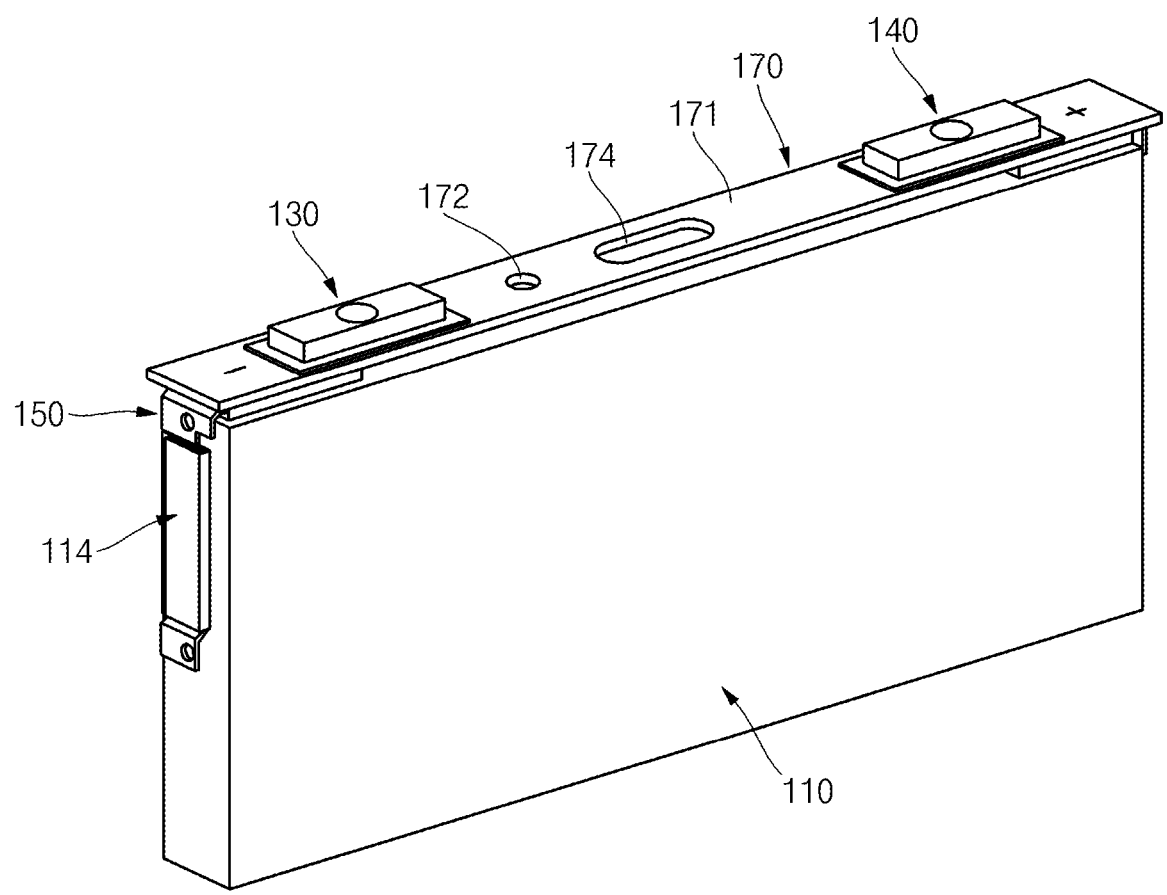
FIGS. 3A and 3B respectively show a perspective view and a partly enlarged perspective view schematically illustrating a cap assembly and an electrode assembly.
Figure 3B:
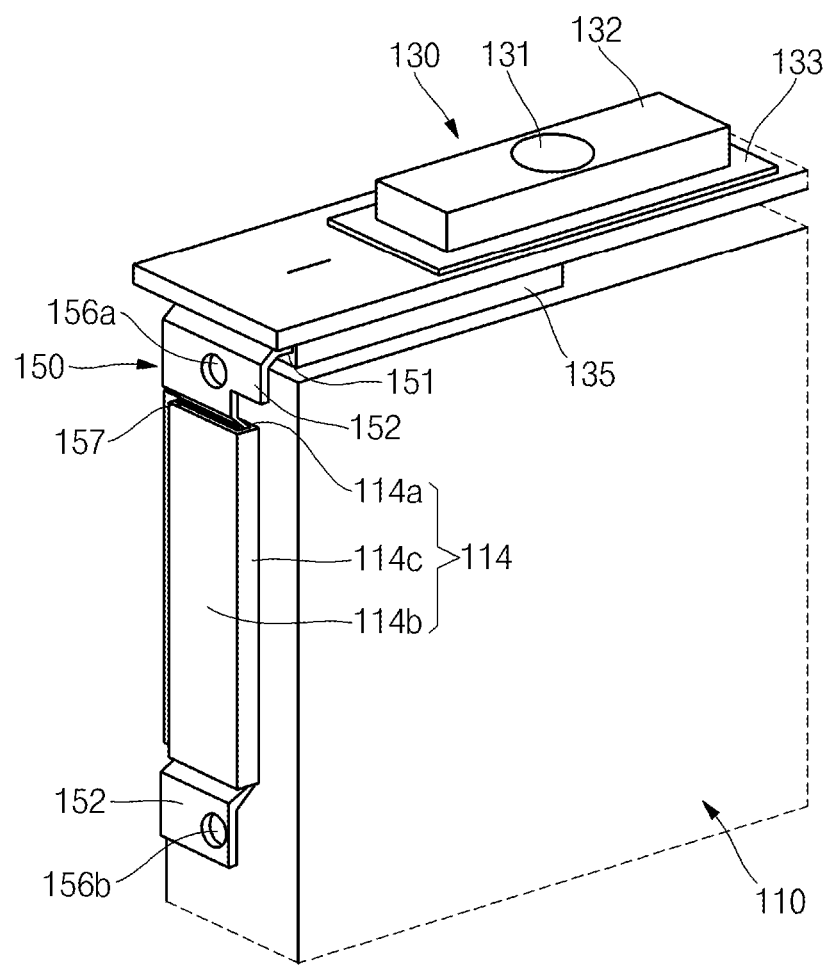
Figure 4A:
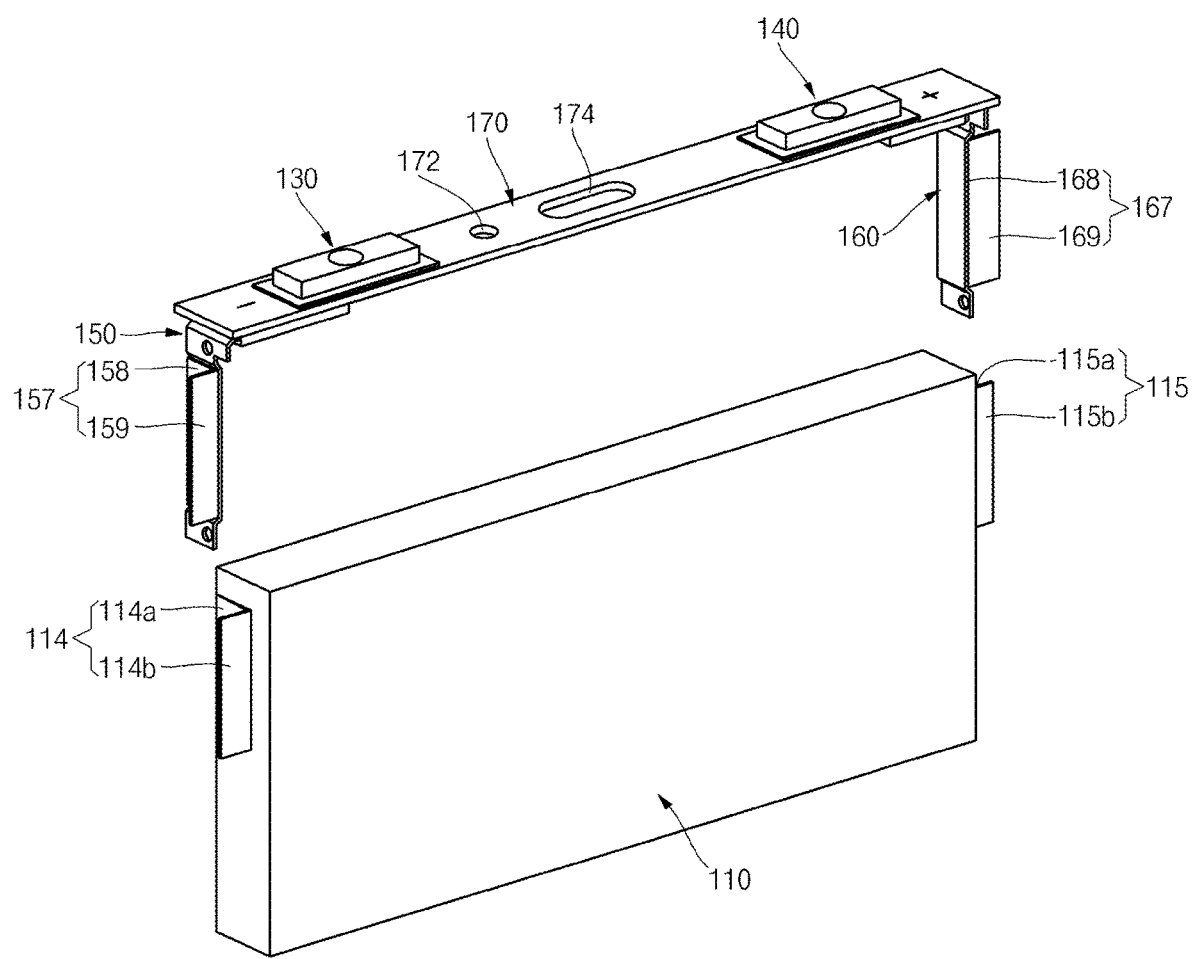
FIGS. 4A and 4B show exploded perspective views of a cap assembly and an electrode assembly.
Figure 4B:
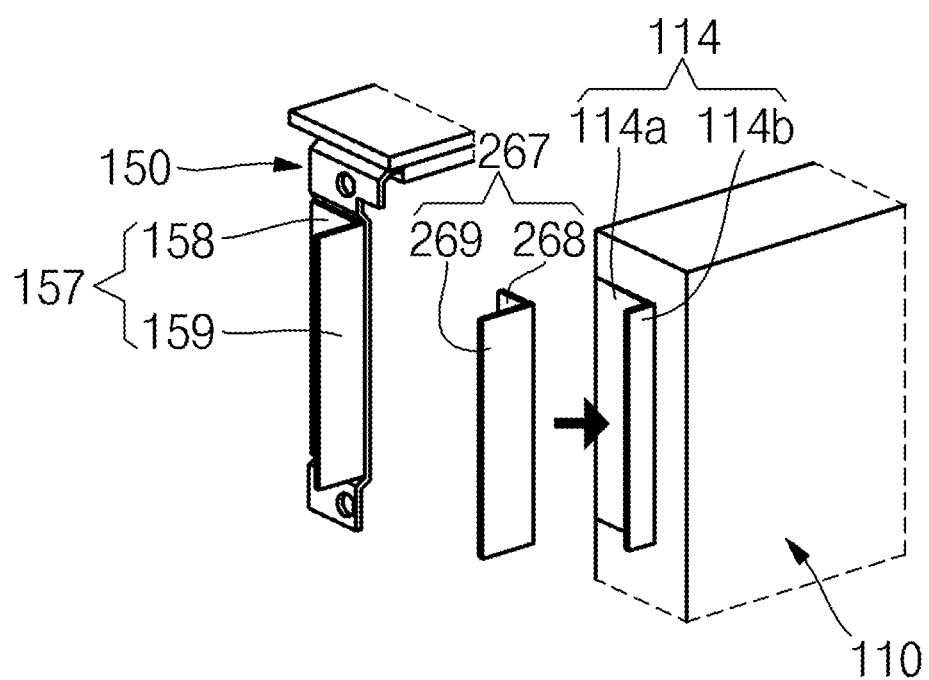

FIGS. 3A and 3B show a perspective view and a partly enlarged perspective view schematically illustrating a connection state of a cap assembly 170 and an electrode assembly 110. FIGS. 4A and 4B show exploded perspective views of a cap assembly 170 and an electrode assembly 110. FIGS. 1 and 2A to 2D may also be referred to in some parts of the following description.

First, referring to FIGS. 3A, 3B and 4A, the first and second uncoated portions 114 and 115 may be respectively coupled to the first and second current collectors 150 and 160 at laterally opposite sides of the stacked electrode assembly 110. The first and second current collectors 150 and 160 may downwardly extend from opposite ends of the cap plate 171 in a direction crossing (e.g., perpendicular to) the laterally opposite sides of the electrode assembly 110 (e.g., may extend in the height direction of the electrode assembly 110). For example, the first and second current collectors 150 and 160 may be connected to the first and second uncoated portions 114 and 115 through the ductile/flexible first and second sub-tabs 157 and 167, respectively. The ductile first and second sub-tabs 157 and 167 may also be referred to as electrode connectors.

Here, each of the first and second uncoated portions 114 and 115 and each of the first and second sub-tabs 157 and 167 (having, for example, an L-bent shape) may be connected to each other and then folded to form a U-shape and to make close contact with laterally opposite sides of the electrode assembly 110. In some embodiments, each of the first and second uncoated portions 114 and 115 and each of the first and second sub-tabs 157 and 167 may be connected to each the respective other in a stacked direction of the electrode assembly 110 (see e.g., FIG. 2C) to be eventually folded at 180 degrees.

In addition, the second sections 152 and 162 of the first and second current collectors 150 and 160 may be downwardly bent to then extend from ends of the first sections 151 and 161 along the laterally opposite sides in the height direction of the electrode assembly, and may be deflected to one edge of the laterally opposite sides along which they extend in the stacked direction of the electrode assembly 110. In some embodiments, the second sections 152 and 162 may be deflected to either side of a central portion of the stacked electrode assembly 110. Therefore, the first and second uncoated portions 114 and 115 protruding/extending from the electrode assembly 110 may be converged approximately at the central portion of the electrode assembly 110 to then be easily bent, so that they can be easily welded to the first and second current collectors 150 and 160. In some embodiments, lengths of the first and second uncoated portions 114 and 115 can be reduced through designs of the first and second current collectors 150 and 160.

Referring to FIG. 4A, a region of each of the first and second sub-tabs 157 and 167 may be attached to the first and second current collectors 150 and 160, respectively, and another region thereof may be connected to the first and second uncoated portions 114 and 115, respectively.

In some embodiments, the first and second sub-tabs 157 and 167 may be divided into first regions 158 and 168, respectively attached to the first and second current collectors 150 and 160, and second regions 159 and 169 respectively attached to the first and second uncoated portions 114 and 115.

The first and second uncoated portions 114 and 115 of the electrode assembly 110 may also be divided into uncoated portion-first regions 114a and 115a respectively making close contact with the laterally opposite sides of the electrode assembly 110 and uncoated portion-second regions 114b and 115b respectively connected to the second regions 159 and 169 of the first and second sub-tabs 157 and 167.

After the second regions 159 and 169 of the first and second sub-tabs 157 and 167 and the uncoated portion-second regions 114b and 115b of the first and second uncoated portions 114 and 115 are connected, they may be folded at 180 degrees, respectively, to overlap with the first regions 158 and 168, respectively, and to make close contact with the electrode assembly 110 from laterally opposite exterior sides of the electrode assembly 110.

In some embodiments, widths of the first regions 158 and 168 and the second regions 159 and 169 of the first and second sub-tabs 157 and 167 may be similar to those of the first and second current collectors 150 and 160 (e.g., of the second sections 152 and 162), and widths of the uncoated portion-second regions 114b and 115b of the first and second uncoated portions 114 and 115 may be also similar to those of the first and second current collectors 150 and 160 (e.g., of the second sections 152 and 162).

In some embodiments, the first regions 158 and 168 of the first and second sub-tabs 157 and 167 may be attached to outer surfaces of the first and second current collectors 150 and 160. Accordingly, the uncoated portion-first regions 114a and 115a of the first and second uncoated portions 114 and 115, the first and second current collectors 150 and 160, the first regions 158 and 168 of the first and second sub-tabs 157 and 167, the second regions 159 and 169 of the first and second sub-tabs 157 and 167, and the uncoated portion-second regions 114b and 115b of the first and second uncoated portions 114 and 115, may be stacked outwardly from the electrode assembly 110 (see e.g., FIG. 2D).

Then, the first and second retainers 180 and 190 having an insulating property may be coupled to exterior portions of regions to which the first and second current collectors 150 and 160 and the first and second uncoated portions 114 and 115 may be connected, thereby protecting structures resulting from the coupling of the first and second current collectors 150 and 160 and the first and second uncoated portions 114 and 115 while blocking (or reducing) electrical connections between the coupled structures and the case 120.

Referring to FIG. 4A, the first and second uncoated portions 114 and 115 may be directly connected to the first and second sub-tabs 157 and 167, respectively. In some cases, however, as shown in FIG. 4B, the first uncoated portion 114 may be connected to the first sub-tab 157 through a separate ductile/flexible lead tab 267.

For example, the first uncoated portion 114 of the electrode assembly 110 may be welded to the first lead tab 267 bent in the approximately L-shaped configuration and the first lead tab 267 may then be connected to the first sub-tab 157 bent in the approximately L-shaped configuration.

In some embodiments, the first and second regions 114a and 114b of the first uncoated portion 114 of the electrode assembly 110 may be welded to the first and second regions 268 and 269 of the first lead tab 267, and the second region 269 of the first lead tab 267 may be welded to the second region 159 of the first sub-tab 157. Thereafter, the first uncoated portion 114, the first lead tab 267 and the first sub-tab 157 may be bent in an approximately U-shaped configuration to then make close contact with the first current collector 150.

In this way, a plurality of first uncoated portions 114 may be first connected to one single first lead tab 267, and the one single first lead tab 267 may be then connected to the first sub-tab 157 and the first current collector 150, thereby facilitating a connection process.

The same feature can also be applied to the connection process between the second uncoated portion 115 and the second sub-tab 167.

Figure 5:
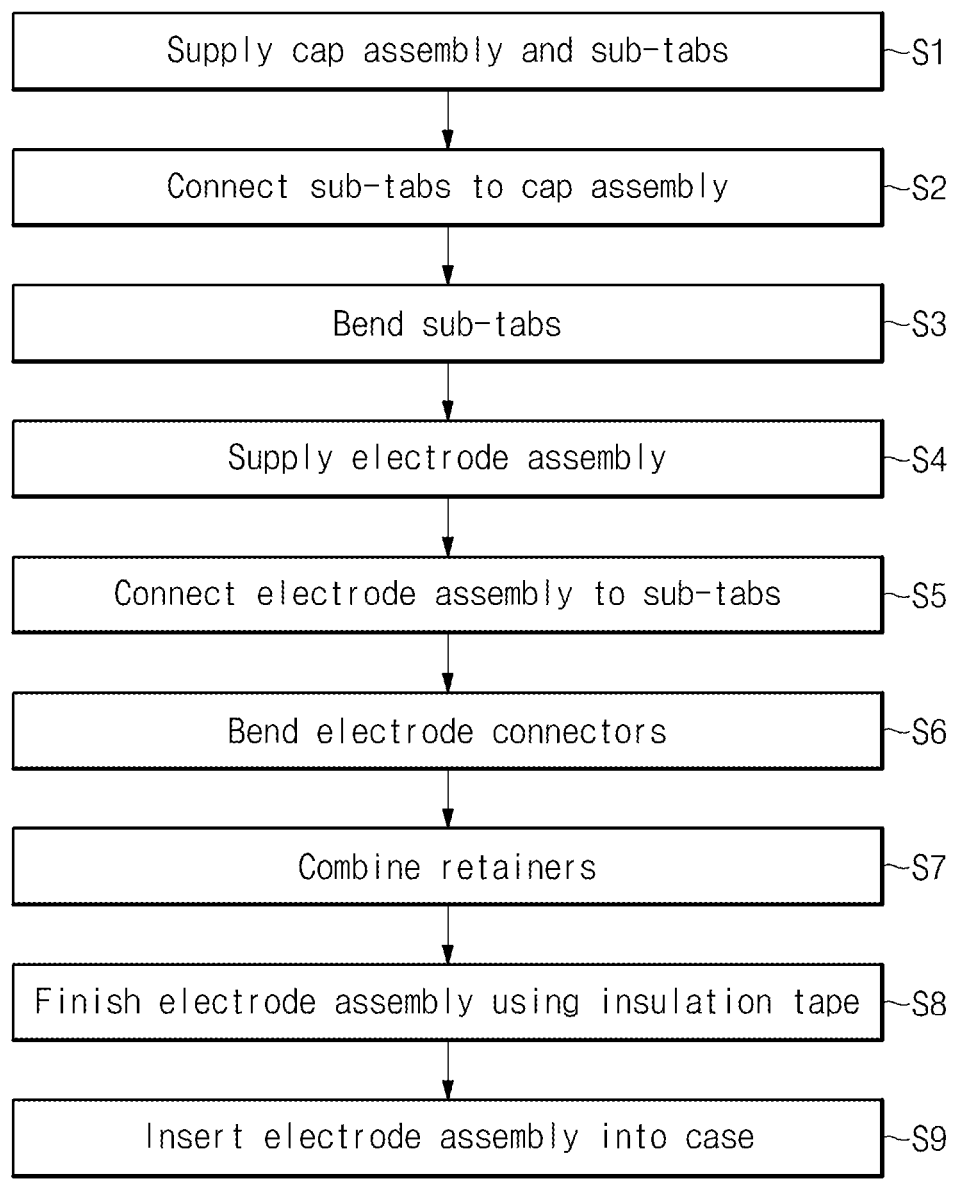
FIG. 5 shows a flow chart illustrating an example assembling method of a secondary battery.

FIG. 5 shows a flow chart illustrating an example assembling method of a secondary battery 100.

As shown in FIG. 5, the example assembling method of the secondary battery 100 of the present disclosure may include acts of supplying a cap assembly and sub-tabs (S1), connecting the sub-tabs to the cap assembly (S2), bending the sub-tabs (S3), supplying an electrode assembly (S4), connecting the electrode assembly to the sub-tabs (S5), bending electrode connectors (S6), combining retainers (S7), finishing the electrode assembly using an insulation tape (S8), and inserting the electrode assembly into a case (S9).

FIGS. 6A to 6I show views illustrating various processing acts of an example assembling method of a secondary battery 100.

Figure 6A:
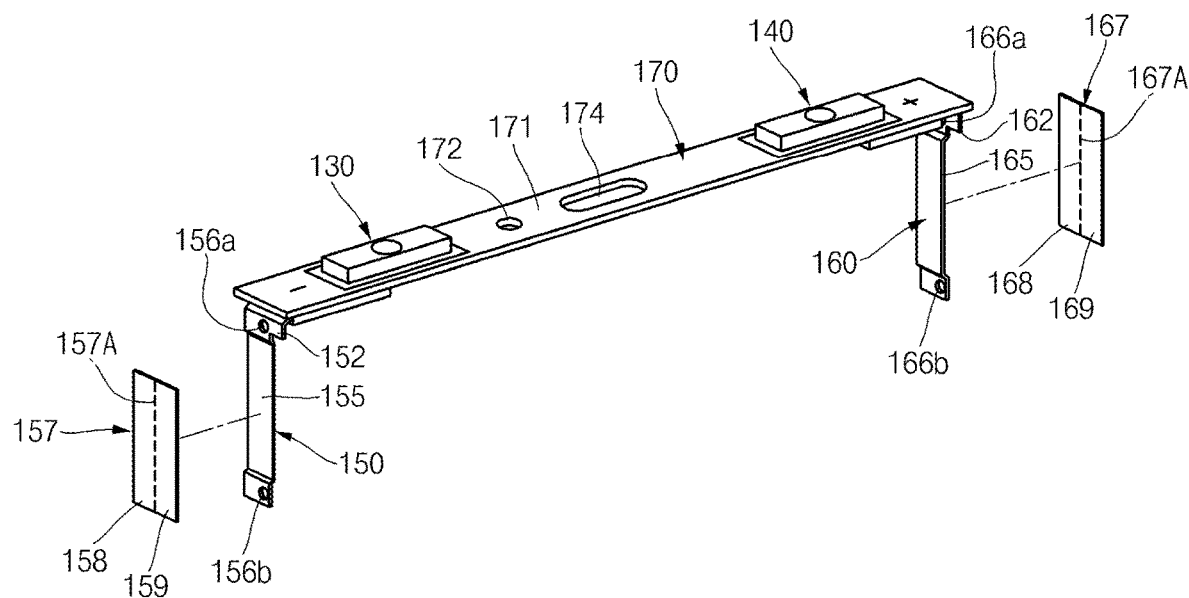
FIGS. 6A to 6I show views illustrating various process acts of an example assembling method of a secondary battery.

As shown in FIG. 6A, in the act of supplying a cap assembly and sub-tabs (S1), the cap assembly 170 shaped of an approximately rectangular planar panel and ductile first and second sub-tabs 157 and 167, also having the shape of a rectangular planar panel, may be supplied.

Here, the first terminal portion 130 and the second terminal portion 140 may pass through the cap plate 171 of the cap assembly 170 and may be coupled thereto. In addition, the first current collector 150 may be connected to the first terminal portion 130, and the second current collector 160 may be connected to the second terminal portion 140. In addition, the first sub-tab 157 may include a first region 158 connected to the first current collector 150 and a second region 159 not connected to the first current collector 150. Likewise, the second sub-tab 167 may include a first region 168 connected to the second current collector 160 and a second region 169 not connected to the second current collector 160.

A boundary between the first region 158 and the second region 159 of the first sub-tab 157 may include one or more bending grooves 157A. Likewise, a boundary between the first region 168 and the second region 169 of the second sub-tab 167 may include one or more bending grooves 167A. The bending grooves 157A and 167A may facilitate easy bending of the first sub-tab 157 and the second sub-tab 167.

Figure 6B:
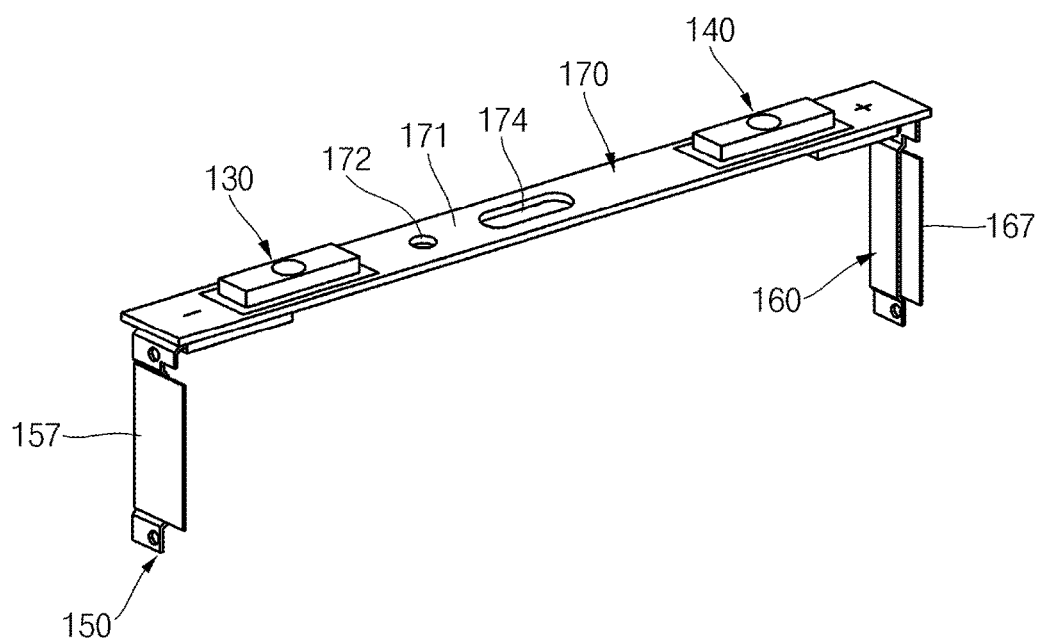

As shown in FIG. 6B, in the act of connecting the sub-tabs to the cap assembly (S2), first region 158 of the first sub-tab 157 may be connected to the first current collector 150 by laser welding, electrical resistance welding or ultrasonic welding, without limitation, and the second region 159 may be configured to extend a predetermined (or set) length from the first region 158 to the side of the first current collector 150. Likewise, the first region 168 of the second sub-tab 167 may be connected to the second current collector 160 by laser welding, electrical resistance welding or ultrasonic welding, without limitation, and the second region 169 may be configured to extend a predetermined (or set) length from the first region 168 to the side of the second current collector 160.

In some embodiments, the first region 158 of the first sub-tab 157 may be connected to the receiving part 155 (which may be formed in the second section 152 by bending) of the first current collector 150, and the first region 168 of the second sub-tab 167 may be connected to the receiving part 165 (which may be formed in the second section 162 by bending) of the second current collector 160 (refer to FIG. 6A).

Figure 6C:
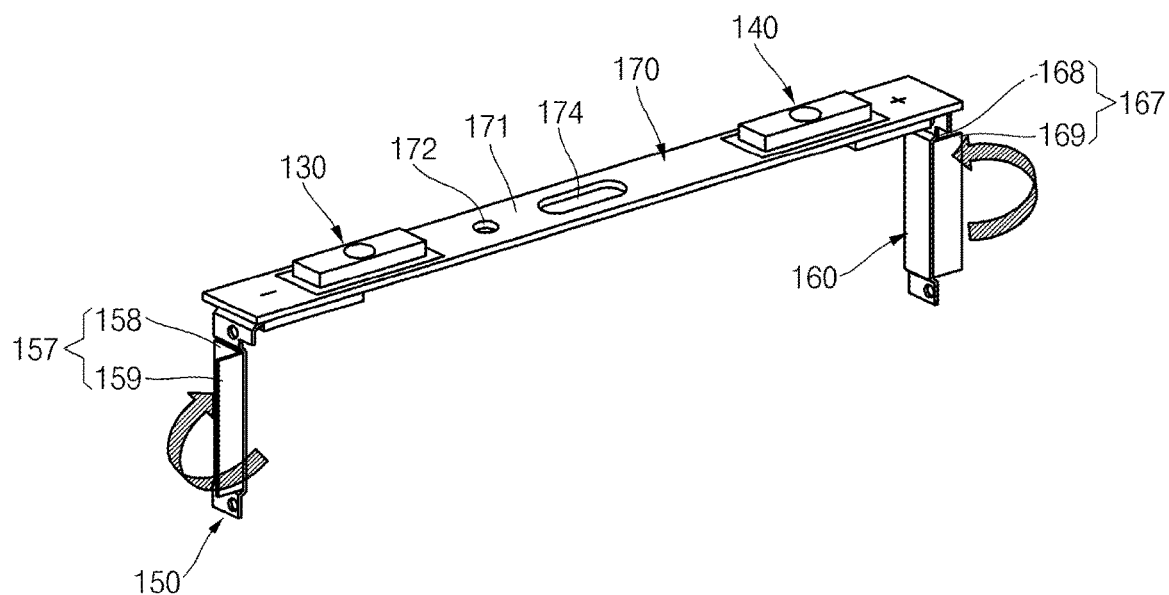

As shown in FIG. 6C, in the act of bending the sub-tabs (S3), the second region 159 of the first sub-tab 157 connected to the first current collector 150 may be outwardly bent approximately 90 degrees, and the second region 169 of the second sub-tab 167 connected to the second current collector 160 may be outwardly bent approximately 90 degrees. For example, the first sub-tab 157 and the second sub-tab 167 may be bent approximately 90 degrees around the bending grooves 157A and 167A, respectively. Here, since the first and second sub-tabs 157 and 167 may have ductility, they can be easily outwardly bent.

Figure 6D:
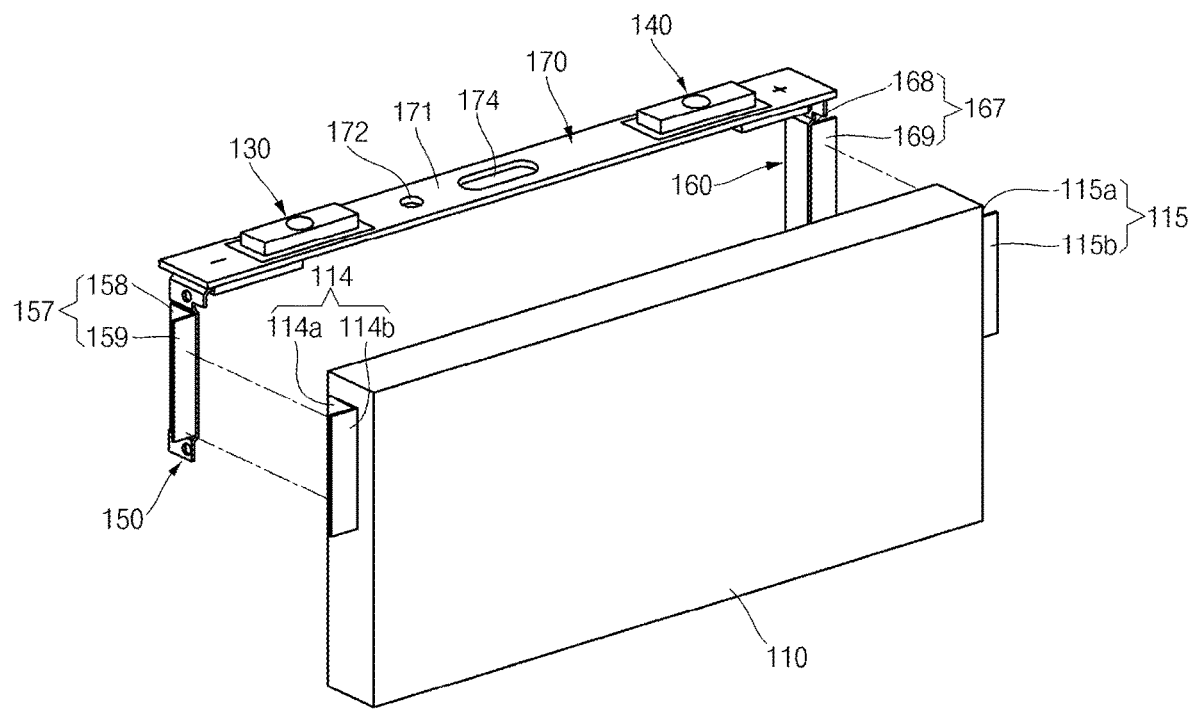

As shown in FIG. 6D, in the act of supplying the electrode assembly (S4), the stacked electrode assembly 110 having the first uncoated portion 114 and the second uncoated portion 115 protruding/extending/bent at its laterally opposite sides may be supplied.

Here, the first uncoated portion 114 may include an uncoated portion-first region 114a making close contact with one side of the electrode assembly 110, and an uncoated portion-second region 114b bent from the uncoated portion-first region 114a and extending substantially parallel with the second region 159 of the first sub-tab 157.

Likewise, the second uncoated portion 115 may include an uncoated portion-first region 115a making close contact with the other side of the electrode assembly 110, and an uncoated portion-second region 115b bent from the uncoated portion-first region 115a and extending substantially parallel with the second region 169 of the second sub-tab 167.

In addition, a height and a width of the uncoated portion-second region 114b of the first uncoated portion 114 may be the same as or similar to those of the second region 159 of the first sub-tab 157, and a height and a width of the uncoated portion-second region 115b of the second uncoated portion 115 may be the same as or similar to those of the second region 169 of the second sub-tab 167.

Figure 6E:
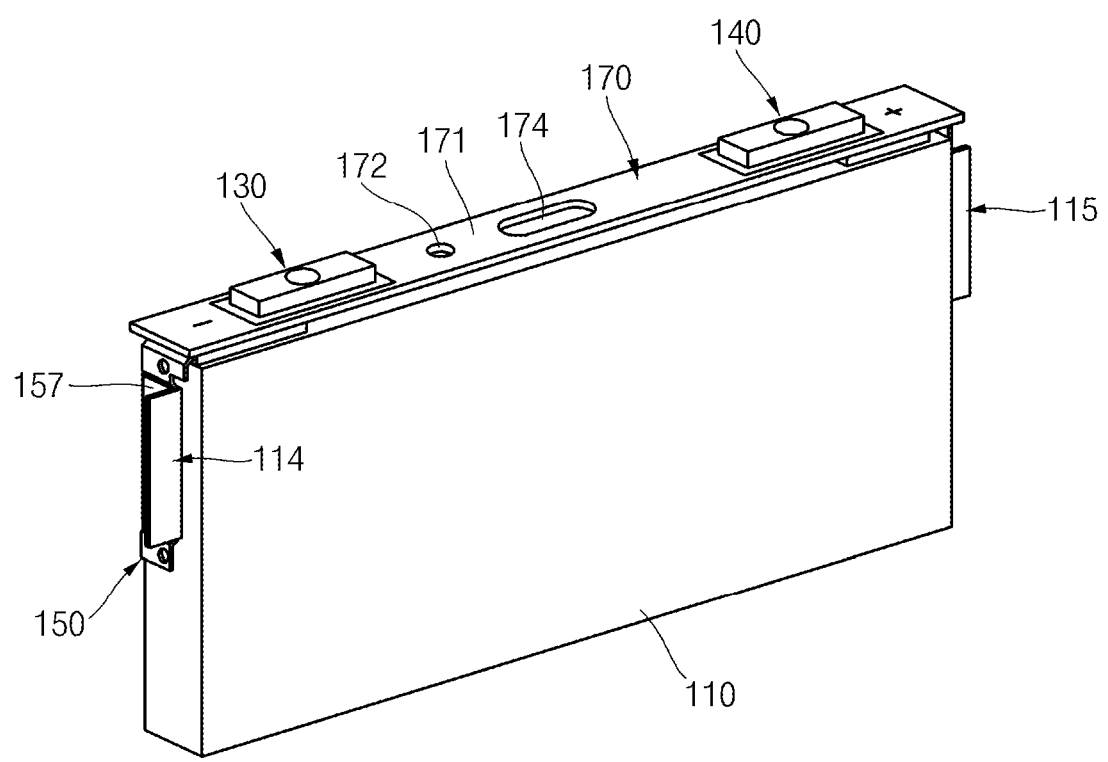

As shown in FIG. 6E, in the act of connecting the electrode assembly to the sub-tabs (S5), the uncoated portion-second region 114b of the first uncoated portion 114 provided at one side of the electrode assembly 110 may be connected to the second region 159 of the first sub-tab 157 by laser welding, electrical resistance welding or ultrasonic welding, without limitation. Likewise, the uncoated portion-second region 115b of the second uncoated portion 115 provided at the other (e.g., opposite) side of the electrode assembly 110 may be connected to the second region 169 of the second sub-tab 167 by laser welding, electrical resistance welding or ultrasonic welding, without limitation.

In this way, the stacked electrode assembly 110 may be electrically connected to the first current collector 150 and the second current collector 160 while being positioned between the first current collector 150 and the second current collector 160. Therefore, the electrode assembly 110 may be handled integrally (e.g., may be coupled integrally) with the cap assembly 170.

Figure 6F:
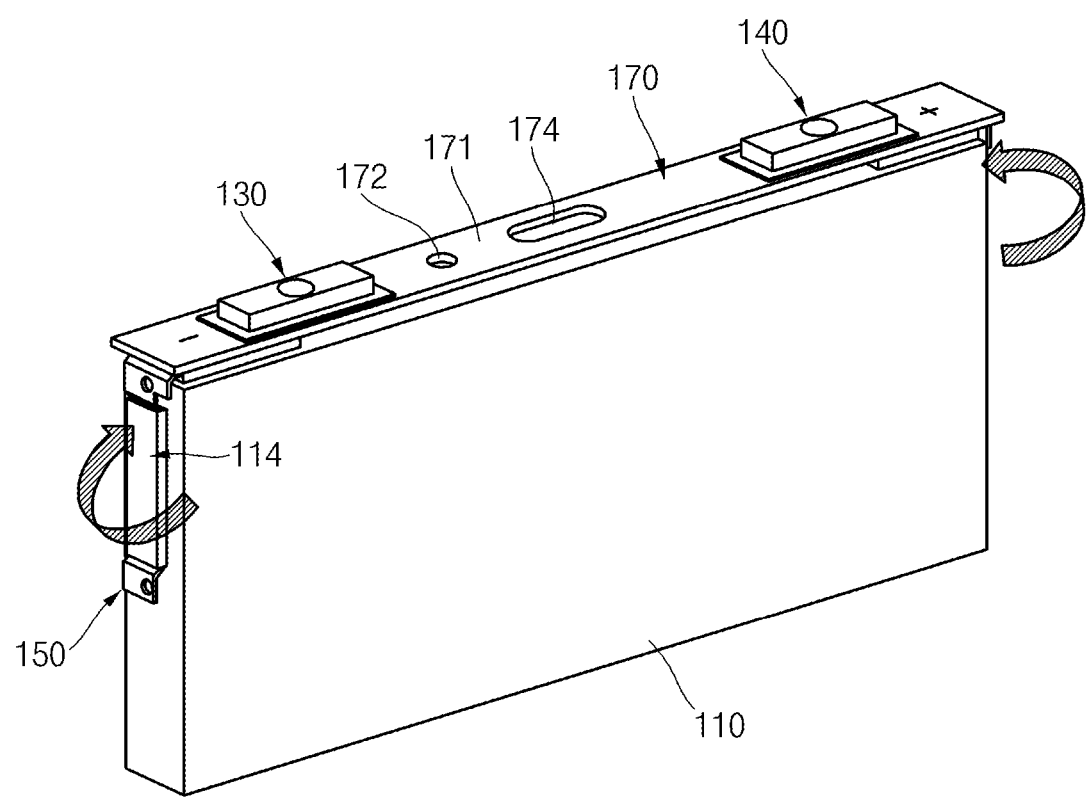

As shown in FIG. 6F, in the act of bending electrode connectors (S6), the first sub-tab 157 connected to the first current collector 150 and the first uncoated portion 114 connected to the first sub-tab 157 may be bent in an approximately U-shaped configuration to make close contact with the first current collector 150. Likewise, the second sub-tab 167 connected to the second current collector 160 and the second uncoated portion 115 connected to the second sub-tab 167 may be bent in an approximately U-shaped configuration to make close contact with the second current collector 160.

In some embodiments, the second region 159 of the first sub-tab 157 connected to the first current collector 150 and the uncoated portion-second region 114b of the first uncoated portion 114 connected to the second region 159 of the first sub-tab 157 may be further bent approximately 90 degrees, so that the first sub-tab 157 and the first uncoated portion 114 may be eventually bent to form an approximately U-shaped configuration. That is, in the first sub-tab 157, the first region 158 and the second region 159 may be bent at 180 degrees relative to each other, to make close contact with each other. In addition, in the first uncoated portion 114, the uncoated portion-first region 114a and the uncoated portion-second region 114b may be also bent 180 degrees relative to each other. For example, the first sub-tab 157 connected to the first current collector 150 and the first uncoated portion 114 connected to the first sub-tab 157 may be bent to be stacked in the width direction of the electrode assembly 110, crossing (e.g., perpendicular to) the stacked direction of the electrode assembly 110.

In some embodiments, the second region 169 of the second sub-tab 167 connected to the second current collector 160 and the uncoated portion-second region 115b of the second uncoated portion 115 connected to the second region 169 of the second sub-tab 167 may be further bent approximately 90 degrees, so that the second sub-tab 167 and the second uncoated portion 115 may be eventually bent to form an approximately U-shaped configuration. That is, in the second sub-tab 167, the first region 168 and the second region 169 may be bent 180 degrees relative to each other, to make close contact with each other. In addition, in the second uncoated portion 115, the uncoated portion-first region 115a and the uncoated portion-second region 115b may be also bent 180 degrees relative to each other. For example, the second sub-tab 167 connected to the second current collector 160 and the second uncoated portion 115 connected to the second sub-tab 167 may be bent to be stacked in the width direction of the electrode assembly 110, crossing (e.g., perpendicular to) the stacked direction of the electrode assembly 110.

Figure 6G:
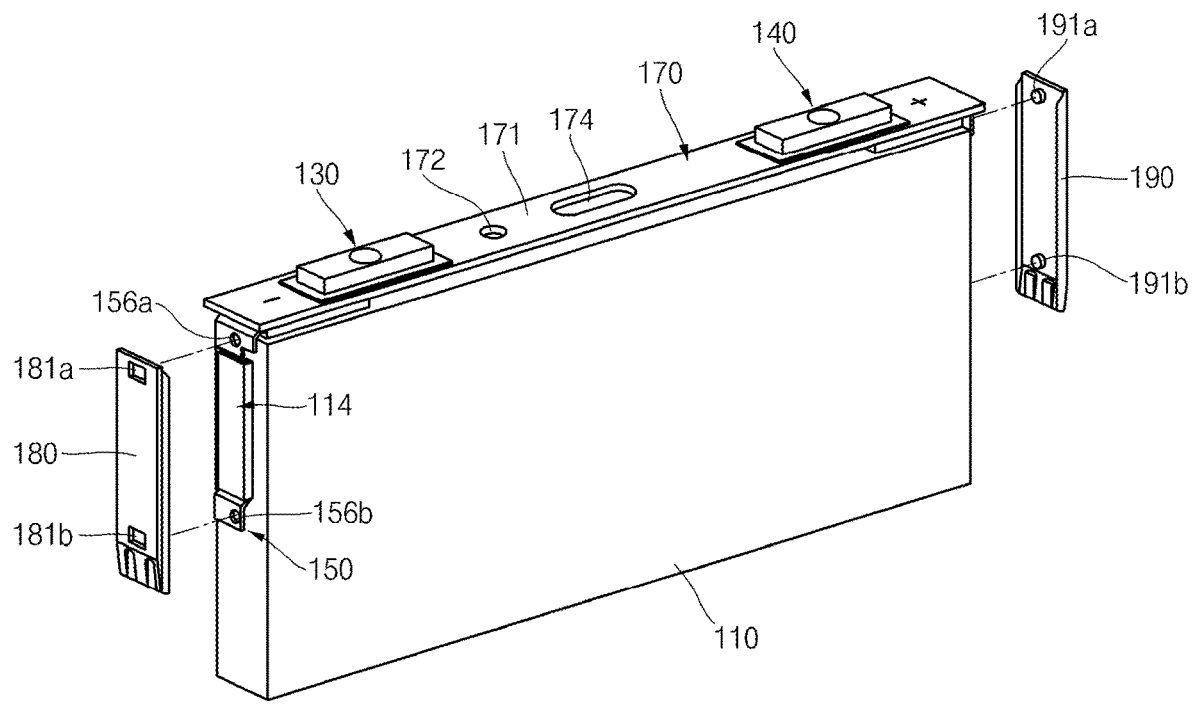

As shown in FIG. 6G, in the act of combining retainers (S7), the first retainer 180 having an insulating property may be combined (e.g., coupled) with the first current collector 150, and the second retainer 190 having an insulating property may be combined with the second current collector 160.

In some embodiments, the protrusions 181a and 181b formed at the top and bottom ends of the first retainer 180 may be respectively engaged with the throughholes 156a and 156b formed at the top and bottom ends of the first current collector 150. In this way, the first retainer 180 may be combined with the first current collector 150 while covering the first uncoated portion 114 and the first sub-tab 157. Therefore, the first retainer 180 may prevent (or reduce) the possibility of the first current collector 150, the first uncoated portion 114 and/or the first sub-tab 157 electrically contacting the inner wall of the case 120.

The protrusions 191a and 191b formed at the top and bottom ends of the second retainer 190 may be respectively engaged with the throughholes 166a and 166b formed at the top and bottom ends of the first current collector 150. In this way, the first retainer 180 may be combined with the second current collector 160 while covering the second uncoated portion 115 and the second sub-tab 167. Therefore, the second retainer 190 may prevent (or reduce) the possibility of the second current collector 160, the second uncoated portion 115 and/or the second sub-tab 167 electrically contacting the inner wall of the case 120.

In some embodiments, the first and second retainers 180 and 190 be formed to have heights and widths equal to or greater than those of the first and second current collectors 150 and 160 (e.g., of the second section 152 of the first current collector 150 and/or of the second section 162 of the second current collector 160).

Figure 6H:
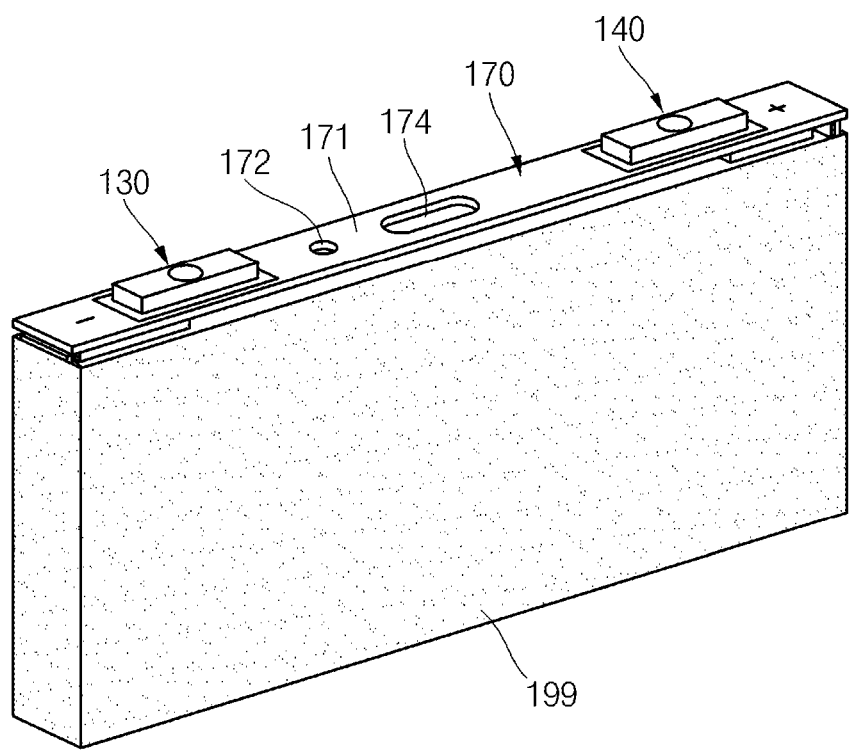

As shown in FIG. 6H, in the act of finishing the electrode assembly using an insulation tape (S8), the electrode assembly 110 may be taped using the insulation tape 199, thereby making the electrode assembly 110 have a compact external appearance. The insulation tape 199 may allow the first and second retainers 180 and 190 protruding at opposite sides of the electrode assembly 110 to make close contact with the opposite sides of the electrode assembly 110, thereby facilitating the inserting of the electrode assembly into the case. The insulation tape 199 may be formed of, for example, polyethylene, polypropylene, or the like, which do not react with an electrolyte, but is not limited thereto.

Figure 6I:
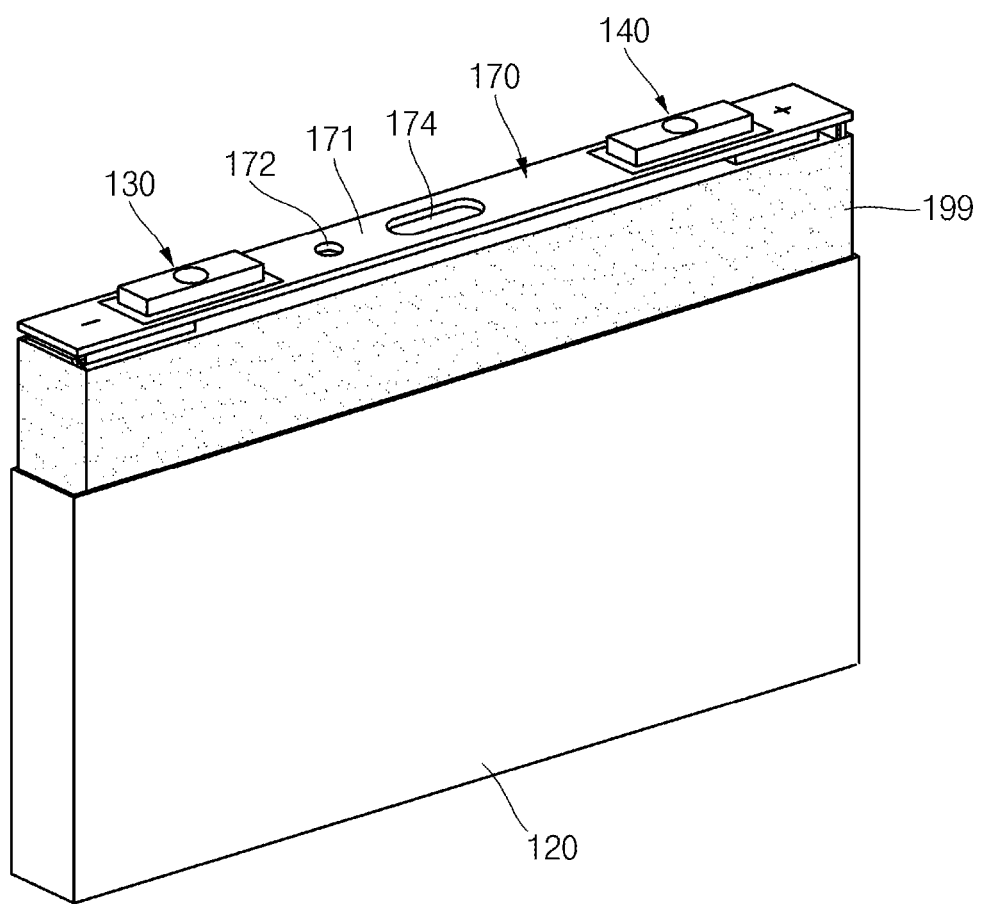

As shown in FIG. 6I, in the act of inserting the electrode assembly into the case (S9), the electrode assembly 110 finished using the insulation tape 199 may be inserted into the case 120 of a prismatic shape. In some embodiments, the electrode assembly 110 may be inserted into the case 120, with the cap plate 171 of the cap assembly 170 completely closing the opening of the case 120.

Thereafter, the cap plate 171 may be laser-welded to the case 120, an electrolyte may be injected into the case 120, and the electrolyte plug 173 and the vent plate 175 may be then coupled to the cap plate 171, thereby completing the secondary battery 100.

As described above, the example secondary battery 100 of the present disclosure may employ the stacked electrode assembly 110, rather than a wound electrode assembly, and may be manufactured such that uncoated portions may extend from laterally opposite sides of the electrode assembly 110 to then make close contact with the side surfaces of the electrode assembly 110. Therefore, in the example secondary battery 100 of the present disclosure, a cell space occupied by the stacked electrode assembly 110 in the case 120 may be increased, compared to the related art jelly-rolled electrode assembly, thereby increasing the capacity of the secondary battery 100.

In addition, the uncoated portions and the current collectors of the electrode assembly 110 may be connected to each other through ductile/flexible sub-tabs and then folded 180 degrees to then make contact with side surfaces of the electrode assembly 110. Therefore, it may be possible to prevent (or reduce) the uncoated portions from penetrating into the electrode assembly 110 or to prevent (or reduce) the electrode connectors from being short-circuited during an assembling process.

As used herein, the terms "use," "using," and "used" may be considered synonymous with the terms "utilize," "utilizing," and "utilized," respectively.

In addition, the terms "substantially," "about," and similar terms are used as terms of approximation and not as terms of degree, and are intended to account for the inherent deviations in measured or calculated values that would be recognized by those of ordinary skill in the art.

While the example secondary battery of the present disclosure has been particularly shown and described with reference to example embodiments thereof, it will be understood by those of ordinary skill in the art that various changes in form and details may be made therein without departing from the spirit and scope of the present disclosure as defined by the following claims and equivalents thereof.

What is claimed is:

1. A secondary battery comprising:
   an electrode assembly comprising a first electrode plate and a second electrode plate, each having an uncoated portion protruding from a respective one of laterally opposite sides of the electrode assembly;
   a current collector at a region corresponding to the uncoated portion of the electrode assembly; and
   a sub-tab electrically connecting the uncoated portion of the electrode assembly to the current collector,
   wherein the uncoated portion and the sub-tab are connected to each other and bent together in the same direction, and
   wherein the current collector comprises:
   a first section extending in a width direction of the electrode assembly; and
   a second section bent from the first section and extending in a height direction of the electrode assembly, the height direction crossing the width direction, and
   wherein the second section includes a bent section comprising:
   a pair of bent parts respectively bent from end portions of the second section toward the electrode assembly; and
   a receiving part connected to the pair of bent parts,
   the bent section being configured to receive the sub-tab and the uncoated portion.

2. The secondary battery of claim 1, wherein the sub-tab is a ductile sub-tab.

3. The secondary battery of claim 1, further comprising a lead tab electrically connecting the uncoated portion of the electrode assembly to the sub-tab, wherein the uncoated portion, the lead tab and the sub-tab are connected to one another and are bent together in the same direction.

4. The secondary battery of claim 3, wherein the lead tab is a ductile lead tab.

5. The secondary battery of claim 1, wherein the electrode assembly is a stacked electrode assembly.

6. The secondary battery of claim 5, wherein the uncoated portion and the sub-tab are connected to each other in a stacked direction of the electrode assembly and bent together in a width direction of the electrode assembly, the width direction crossing the stacked direction.

7. The secondary battery of claim 1, wherein the sub-tab is welded to the current collector and the uncoated portion is welded to the sub-tab.

8. The secondary battery of claim 1, further comprising a retainer combined with the current collector and covering the uncoated portion and the sub-tab.

9. The secondary battery of claim 8, wherein
   the retainer has a height, in the height direction of the electrode assembly, and a width, in a stacked direction of the electrode assembly, at least as those of the second section of the current collector.

10. The secondary battery of claim 1, wherein the sub-tab comprises:
a first region connected to the current collector; and
a second region connected to the uncoated portion,
wherein the second region is folded together with the uncoated portion to overlap with the first region in a width direction of the electrode assembly.

11. The secondary battery of claim 10, wherein the sub-tab comprises one or more bending grooves at a boundary between the first region and the second region.

12. The secondary battery of claim 10, wherein the uncoated portion comprises:
an uncoated portion-first region in contact with a corresponding one of the laterally opposite sides of the electrode assembly; and
an uncoated portion-second region connected to the second region of the sub-tab,
wherein the uncoated portion-second region is folded together with the second region of the sub-tab to overlap the uncoated portion-first region in the width direction of the electrode assembly.

13. The secondary battery of claim 12, wherein a height and a width of the uncoated portion-second region are substantially the same as those of the second region of the sub-tab.

14. The secondary battery of claim 1, further comprising an insulation tape surrounding the electrode assembly and the current collector.

15. The secondary battery of claim 1, wherein the current collector extends along and is coupled to a corresponding one of the laterally opposite sides of the electrode assembly, the current collector being deflected to one edge of the one of the laterally opposite sides of the electrode assembly, in a stacked direction of the electrode assembly.

16. The secondary battery of claim 1, wherein the sub-tab has a smaller thickness than that of the current collector.

17. The secondary battery of claim 1, wherein
the sub-tab is substantially the same in width, in a stacked direction of the electrode assembly, as the second section of the current collector, and
the uncoated portion is substantially the same in width, in the stacked direction of the electrode assembly, as the second section of the current collector.

* * * * *